(12) United States Patent
Herlocker et al.

(10) Patent No.: US 10,008,110 B1
(45) Date of Patent: Jun. 26, 2018

(54) DETECTING RESTRICTIONS ON TURNING PATHS IN DIGITAL MAPS

(71) Applicant: Mapbox, Inc., San Francisco, CA (US)

(72) Inventors: Morgan Herlocker, Oakland, CA (US); Camille Teicheira, San Francisco, CA (US)

(73) Assignee: MAPBOX, INC., San Jose, CA (US)

( * ) Notice: Subject to any disclaimer, the term of this patent is extended or adjusted under 35 U.S.C. 154(b) by 0 days. days.

(21) Appl. No.: 15/435,222

(22) Filed: Feb. 16, 2017

(51) Int. Cl.
| | | |
|---|---|---|
| *G08G 1/01* | (2006.01) | |
| *G01C 21/24* | (2006.01) | |
| *G01C 21/34* | (2006.01) | |
| *G08G 1/056* | (2006.01) | |

(52) U.S. Cl.
CPC ........... *G08G 1/0112* (2013.01); *G01C 21/34* (2013.01); *G08G 1/0137* (2013.01); *G08G 1/0129* (2013.01); *G08G 1/0133* (2013.01); *G08G 1/056* (2013.01)

(58) Field of Classification Search
CPC .......... G08G 1/00; G08G 1/01; G08G 1/0104; G08G 1/0108; G08G 1/0112; G08G 1/012; G08G 1/0125; G08G 1/0129; G08G 1/0133; G08G 1/0137; G08G 1/0141; G08G 1/056; G08G 1/065; G08G 1/123; G08G 1/127; G08G 1/13
See application file for complete search history.

(56) References Cited

U.S. PATENT DOCUMENTS

| 2012/0136570 A1* | 5/2012 | Yamashita | G01C 21/32 701/437 |
| 2015/0134233 A1* | 5/2015 | Wolf | G01C 21/32 701/118 |
| 2015/0285656 A1* | 10/2015 | Verheyen | G01C 21/32 701/428 |
| 2016/0327404 A1* | 11/2016 | Israelsson | G08G 1/096741 |

(Continued)

FOREIGN PATENT DOCUMENTS

JP    2005267472 A  *  9/2005

OTHER PUBLICATIONS

Efentakis et al., "Crowdsourcing turning restrictions for OpenStreetMap," Mar. 28, 2014, Workshop Proceedings of the EDBT/ICDT 2014 Join Conference.*

(Continued)

*Primary Examiner* — Thomas G Black
*Assistant Examiner* — Sara J Lewandroski
(74) *Attorney, Agent, or Firm* — Fenwick & West LLP (57) ABSTRACT

A method comprises identifying, in an electronic map, road data and intersection data, wherein the intersection data specifies an approach and two or more exits from the approach, bounding the approach using a bounding box around the entrance to an approach, identifying, using the bounding box, traces associated with the approach, wherein each trace identifies a path of a vehicle on one or more of the roads, for each trace of the plurality of traces, identifying which of the two or more exits most closely matches the particular trace, generating histograms based on a time (Continued)

period and which of the two or more exits most closely matches each trace of the plurality of traces, determining, using the histograms, whether one or more threshold values associated with one of the two or more exits is satisfied, sending a notification signal when the one or more threshold values is satisfied.

24 Claims, 5 Drawing Sheets

(56) References Cited

U.S. PATENT DOCUMENTS

2017/0061787 A1* 3/2017 Lorkowski ............ G01C 21/32
2017/0074670 A1* 3/2017 Tashiro ................. G01C 21/32

OTHER PUBLICATIONS

Wang et al., "3D-LIDAR based Branch Estimation and Intersection Location for Autonomous Vehicles," Jun. 11-14, 2017, IEEE.*
Oosterom, "Spatial Access Methods," 1999, Geographical Information Systems Principles.*
Efentakis et al., "Crowdsourcing turning restrictions for OpenStreetMap," Mar. 28, 2014, Workshop Proceedings of the EDBT/ICDT 2014 Joint Conference.*

* cited by examiner

DETECTING RESTRICTIONS ON TURNING PATHS IN DIGITAL MAPS

TECHNICAL FIELD

The technical field of the present disclosure generally relates to improved methods, computer software and/or computer hardware in the field of electronic maps. The disclosure relates more specifically to improved computer-implemented methods for detecting changes in turn paths in electronic mapping.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Digitally stored electronic maps are used to provide directions to users of mobile or onboard navigation devices, for example, using any of a wide array of standalone map or direction application programs or apps. Today's electronic maps correctly determine where a device is within a few feet or meters, or show where the user of that device is on the electronic map in real time. Electronic maps also typically include other functionality, such as providing turn-by-turn directions to nearly any location. Additional elements such as traffic or wrecks may also be shown.

Electronic maps also appear in other applications aside from standalone mapping applications. For example, ride sharing applications, taxi applications, video games, and other applications may use digital maps. These or other applications can obtain electronic maps by calling a map server computer through an Application Programming Interface (API). Thus, a single electronic map provider that owns or operates the server computer may supply the electronic maps for many different applications.

When using an electronic map, the location of a user's device can be determined using WiFi or the Global Positioning System (GPS), which reports a user's location using latitude and longitude, and optionally height and time as well. This location data, as well as other data, is collected by the electronic map provider. Despite collecting large amount of data, electronic maps are not perfect. For example, a digital map stored at the server computer may specify that a vehicle cannot turn or transition from a first road to a second road, when in fact such a turn or transition is possible at the real-world location corresponding to the mapped location. Or, the map may specify that a turn is possible, but at the real-world location the turn may be impossible due to construction, road realignment, road removal or other factors. Acquiring corrective data for such situations, in the past, has required active manual individual reports from drivers or other observers who have visited the location. These reports can be falsified, or not received soon enough to update the map with a desired degree of accuracy. Thus, improved methods for electronic mapping are needed.

DETAILED DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1. OVERVIEW
2. EXAMPLE COMPUTER SYSTEM IMPLEMENTATION
3. EXAMPLE FUNCTIONAL IMPLEMENTATION
4. EXAMPLE DETECTION OF TURN RESTRICTION
5. HARDWARE OVERVIEW

1. Overview

Computer-implemented techniques are provided for detecting turn restrictions in digitally stored electronic maps. A "turn restriction," in this context, means a prohibition or limit on turning or transitioning from a first road or path to a second road or path that exists in a real-world location that corresponds to a digitally mapped representation of that location. Examples of turn restrictions include "no left turn," "no right turn," "no U-turn," and similar or equivalent limits or constraints.

Specifically, in various programmable algorithms a determination is made whether a turn restriction present in an electronic map is correct based on collected real world data. "Real world data," in this context, means data representing actual physical movement of location-enabled computing devices or location tracking dongles attached to a car or other vehicle along one or more mapped roads or paths. Initially, in an electronic map, intersections of two or more roads are identified. The electronic map may utilize a normalized road network. In a normalized road network, the roads are referred to as edges and intersections where roads meet are referred to as nodes. Further, the normalized road network is electronically modified such that edges are split whenever a node is shared with another edge. Additionally, edges are merged when less than three edges share a single node. "Road," in this context, refers to any mapped path that is represented in the digitally stored electronic map data. Although in the real world a single road with both northbound and southbound lanes would be referred to as a single road, in an electronic map the northbound and the southbound lanes may be separated into different roads. Turn restrictions may also be included or associated with the intersection in digitally stored data.

Subsequently, real data from actual trips taken by users of mobile data is collected, processed, and stored. Based on this data, using in-memory digital analysis techniques, a bounding box is conceptually placed around an entrance point of an approach to an intersection for which the algorithms are to perform turn restriction detection. Using the bounding box, real world data is identified that represents trips that entered the intersection from the approach. Then, each trace, or trip, in the data is followed a predetermined distance and the nearest exit of the intersection is determined. The results are tracked and statistical histograms are generated to track the count or frequency of maneuvers taken, such as a right turn, left turn, going straight, U-turn, etc. Real world data may be associated with a bounding box upon receipt of the real world data, when the real world data is processed, or at any other time. In an embodiment, a segment of a trace is used to search all bounding boxes and, when the segment of the trace crosses the bounding box, that trace is associated with the bounding box. Optionally, additional filtering may be performed, such as by using a heading value.

Using the histograms, a determination is made whether threshold values were satisfied. Optionally, in response to the determination, notifications may be sent as needed. Subsequent actions may be taken based on the notifications, such as a closer review of the data, or a modification of the turn restriction data for the intersection. The modification may include, for example: adding a turn restriction, removing a turn restriction, or modifying a turn restriction.

In one embodiment, a data processing method providing an improvement in signaling a notification when movement signals from vehicles are inconsistent with digitally stored map data. The method comprises identifying, in an electronic map comprising road data specifying a plurality of roads, intersection data specifying an intersection where three or more of the roads share a vertex, wherein the intersection data comprises approach data specifying an approach and exit data specifying two or more exits from the intersection that could be made from the approach; bounding the approach enter point data using bounding box data that specifies a bounding box around the approach; identifying, using the bounding box, a plurality of traces associated with the approach, wherein each of the traces identifies a path of a vehicle on one or more of the plurality of roads; for each trace of the plurality of traces, identifying which of the two or more exits most closely matches the particular trace; generating histogram data comprising a plurality of histograms based on a time period and which of the two or more exits most closely matches each trace of the plurality of traces; determining, using the histogram data, whether one or more threshold values associated with one of the two or more exits is satisfied; and sending a notification signal when the one or more threshold values is satisfied.

Other embodiments, aspects and features will become apparent from the disclosure as a whole.

2. Example Computer System Implementation

Figure 1:
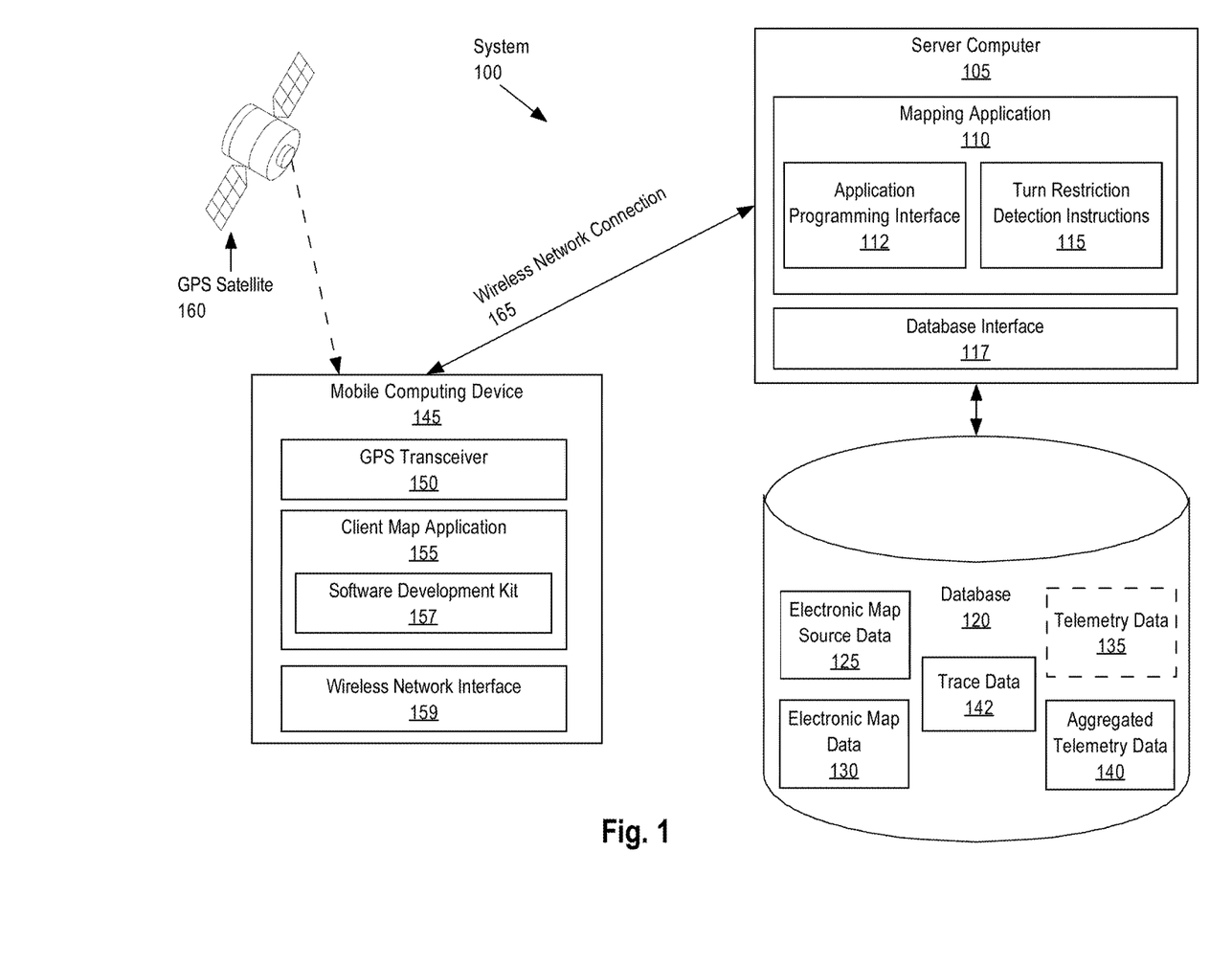
FIG. 1 illustrates an example computer system in which the techniques described may be practiced, according to one embodiment.

FIG. 1 illustrates an example computer system in which the techniques described may be practiced, according to one embodiment.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 145 that is coupled via a wireless network connection 165 to a server computer 105, which is coupled to a database 120. A GPS satellite is coupled via a wireless connection to the mobile computing device 145. The server computer comprises a mapping application 110, an application programming interface (API) 112, turn restriction detection instructions 115 and a database interface 117. The database 120 comprises electronic map source data 125, electronic map data 130, telemetry data 135, aggregated telemetry data 140 and trace data 142. The mobile computing device 145 comprises a GPS transceiver 150, client map application 155, software development kit (SDK) 157 and wireless network interface 159.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 120 and mobile computing device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 117, to facilitate various aspects of embodiments described herein.

In one embodiment, database interface 117 is a programmatic interface such as JDBC or ODBC for communicating with database 120. Database interface 117 may communicate with any number of databases and any type of database, in any format. Database interface 117 may be a piece of custom software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database 120 may include one or nodes located at one or more data warehouses. Additionally, in one embodiment, database 120 may be located on the same device or devices as server computer 105. Alternatively, database 120 may be located on a separate device or devices from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, telemetry data 135, aggregated telemetry data 140, and trace data 142. These datasets may be stored as columnar data in a relational database or as flat files.

In one embodiment, electronic map source data 125 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 125 may be updated at any suitable interval, and may be stored for any amount of time. Once obtained or received, electronic map source data 125 is used to generate electronic map data 130.

In one embodiment, electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector tiles which may be subject to style data to impose different display styles. Electronic map data 130 may be updated at any suitable interval, and may include additional information beyond that derived from electronic map source data 125. For example, using aggregated telemetry data 140, discussed below, various additional information may be stored in the vector tiles, such as traffic patterns, turn restrictions, detours, common or popular routes, speed limits, new streets, and any other information related to electronic maps or the use of electronic maps.

In one embodiment, telemetry data 135 is digital data that is obtained or received from mobile computing devices via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 140. Additionally, telemetry data 135 may be received from other computing devices, such as a vehicle's onboard computing device, dongles that plug into a vehicle's computer system, or any other location-enabled device.

The telemetry data may include mobile device location information based on GPS signals. For example, telemetry data 135 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude (latlong) values for the then-current position of the mobile device, a session identifier, instance identifier, application identifier, device data, connectivity data, view data, and timestamp.

In one embodiment, aggregated telemetry data 140 is telemetry data 135 that has been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data 140 is stored in association with one or more tiles related to electronic map data 130. Aggregated telemetry data 140 may be stored for any amount of time, such as a day, a week, or more. Aggregated telemetry data 140 may be further processed or used by various applications or functions as needed.

In one embodiment, trace data 142 is a set of aggregated telemetry data that represents the movement of a mobile device from a first point to a second point. A particular trace may contain two or more GPS data points, depending on the length of the trace and how frequently GPS data was provided from an associated mobile computing device. As a result of chunking, a particular trace data item does not necessarily correlate to a complete real-world movement of an associated mobile device. Trace data 142 may be stored or associated with one or more tiles related to electronic map data 130, and may be stored for any amount of time.

In one embodiment, mobile computing device 145 is any mobile computing device, such as a laptop computer, handheld computer, wearable computer, cellular or mobile phone, portable digital assistant (PDAs, or tablet computer. Although a single mobile computing device is depicted in FIG. 1, any number of mobile computing devices may be present. Each mobile computing device 145 is communicatively connected to server computer 105 through wireless network connection 165 which comprises any combination of a LAN, a WAN, one or more internetworks such as the public Internet, a cellular network, or a company network.

Mobile computing device 145 is communicatively coupled to GPS satellite 160 using GPS transceiver 150. GPS transceiver 150 is a transceiver used by mobile computing device 145 to receive signals from GPS satellite 160, which broadly represents three or more satellites from which the mobile computing device may receive signals for resolution into a latitude-longitude position via triangulation calculations.

Mobile computing device 145 also includes wireless network interface 159 which is used by the mobile computing device to communicate wirelessly with other devices. In particular, wireless network interface 159 is used to establish wireless network connection 165 to server computer 105. Wireless network interface 159 may use WiFi, WiMAX, Bluetooth, ZigBee, cellular standards or others.

Mobile computing device 145 also includes other hardware elements, such as one or more input devices, memory, processors, and the like, which are not depicted in FIG. 1. Mobile computing device 145 also includes applications, software, and other executable instructions to facilitate various aspects of embodiments described herein. These applications, software, and other executable instructions may be installed by a user, owner, manufacturer, or other entity related to mobile computing device. In one embodiment, mobile computing device 145 includes client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In server computer 105, the mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: sending electronic map data to mobile computing devices, receiving telemetry data 135 from mobile computing devices, processing telemetry data to generate aggregated telemetry data 140, generating trace data 142, organizing trace data 142, receiving electronic map source data 125 from data providers, processing electronic map source data 125 to generate electronic map data 130, and any other aspects of embodiments described herein. Mapping application 110 includes turn restriction detection instructions 115 which are programmed or configured to perform turn restriction detection.

In one embodiment, turn restriction detection instructions 115 are programmed or configured to perform identifying an intersection in an electronic map and determining whether one or more turn restrictions are associated with the intersection based on real-world movement of mobile computing devices. An intersection may be identified by determining where three or more roads in the electronic map intersect at a vertex. "Road," in this context, refers to any mapped path that is represented in the digitally stored electronic map data. Although in the real world a single road with both northbound and southbound lanes would be referred to as a single road, in an electronic map the northbound and the southbound lanes may be separated into different roads. Each intersection has approaches and exits. An approach is an entrance for a vehicle into an intersection, while an exit is where a vehicle may exit the intersection from one or more approaches. Thus, for a four way intersection, if the approach is the bottom side of the intersection, then the exits may be the top, left, and right side. Intersections in the electronic map may be identified periodically, such as when new roads are added to the electronic map, once a day, once a week, or at any other interval. Once identified, the intersections may be stored, or otherwise associated, with the electronic map.

In one embodiment, the turn restriction detection instructions 115 are programmed or configured to perform bounding of areas of an electronic map, such as the entrance point of an approach to an intersection. "Bounding," in this context, refers to calculating points or lines that surround an approach and storing digital data values in memory that represent these bounds. Typically, the bounding or bounding box is a west-most longitude, a south-most latitude, an east most longitude, and a north-most latitude of the entrance point of an approach to an intersection. The bounding may be performed based on rules, based on the configuration of lanes or other aspects of the road, or using any other method. Although the bounding area is typically a 2-dimensional rectangle, the bounding area may be of any size, and any shape including a set of points, lines, vectors, or data definitions of regular or irregular polygons.

In one embodiment, turn restriction detection instructions 115 are programmed or configured to perform searches on map data using a segment of a trace to identify which portion of a map, such as a specific intersection or approach, the trace is associated with. Specifically, the searches are performed on R-trees, and are used to identify which intersection or approach a trace is associated with. "Trees," in this context, refer to digitally stored data structures comprising nodes that are connected by branches to other nodes. For example, a new trace may be used to search an R-tree of bounding boxes to identify which bounding box, if any, the new trace crosses. Thus, over time, many different traces may be associated with a given bounding box, and may subsequently be used for the methods discussed below. Optionally, prior to searching for a bounding box associated with a trace, the trace may be filtered based on any available data, such as an overall quality of the trace, a speed value, a heading direction, a time of day, a day of the week, a day of a month, what application the data of the trace is from, etc. Alternatively, the filtering may happen at any other time.

In one embodiment, turn restriction detection instructions 115 are programmed or configured to perform identifying which exit the traces most closely match or are nearest to. Specifically, each trace is followed from the starting point, or other suitable point, until the end of the trace is reached. Then, from the end of the trace, the exit which most closely matches the trace is calculated. Alternatively, a trace may be followed for a predetermined distance, such as 200 feet, 400 feet, a distance related to the size of the intersection, or any other distance. By following the trace past the exit of an intersection, the calculation of which exit most closely matches the trace is made easier and less time consuming. After determining which exit most closely matches a trace, a count associated with that exit is increased. A total count for each exit, relative to a particular approach may be tracked over any time period. For example, to determine if a left turn is allowed from a given approach, the traces from the past two days may be examined. A separate count may be tracked for each exit, and the results compared to determine if a left turn is allowed. The count for exits may be used in generating histograms, discussed below.

In one embodiment, turn restriction detection instructions 115 are programmed or configured to perform generating, and aggregating, histograms. Specifically, the histograms may be generated based on the count data generated by identifying which exit a trace is nearest. The histograms may be generated based on any suitable time period, such as a day, a week, or an hour. For example, fifteen minute increments may be used to bin counts for exits and generate histograms to aid in determining whether a turn is restricted during certain hours, such as rush hour or other high traffic times. Histograms may also be aggregated as needed. Continuing the above example, if histograms are generated in fifteen minute increments, then multiple fifteen minute histograms may be aggregated to get the larger picture, such as a few hours or a day.

In one embodiment, turn restriction detection instructions 115 are programmed or configured to perform determining whether thresholds were satisfied. The thresholds may be set to any amount, and may be established for any purpose. For example, if an electronic map indicates that a left turn is restricted from a particular approach to an intersection, the threshold may be set to twenty percent of traces associated with that approach. Then, the threshold is satisfied when more than twenty percent of traces associated with that approach include a left turn. This would indicate that the left turn restriction may be incorrect. Conversely, as another example, if an electronic map indicates that a right turn is allowed at a particular approach to an intersection, the threshold may also be set to a low amount, such as ten percent. However, the threshold in this example is satisfied when the amount of right turns is below ten percent, which may indicate that a right turn is restricted at this intersection from the associated approach. Thresholds may be set based on a total count, a percentage of volume, or any other suitable standard.

In one embodiment, turn restriction detection instructions 115 are programmed or configured to perform sending notification signals. The notification signals may be sent in any format and at any time. Specifically, the notification may include relevant information, such as the intersection, approach, exit, time, or other information. The notification may be sent to an administrator, developer, user, or other entity. The notifications may be presented in a dashboard or other interface so that the notifications may be reviewed and any further actions taken as deemed necessary. Further actions may include, but are not limited to: removing, modifying, or adding a turn restriction to an intersection, adjusting thresholds for notifications, and adjusting other settings related to turn restriction detection. In all embodiments, the use of notification messages is optional. In some embodiments, the further actions noted above may be performed automatically without a notification message. For example, threshold detection as previously described could result in automatically removing, modifying, or adding a turn restriction to an intersection, adjusting thresholds for notifications, and adjusting other settings related to turn restriction detection, under computer program control and without a notification or manual review or intervention.

In one embodiment, turn restriction detection instructions 115 are programmed or configured to perform automatic updating of the electronic map. The updating may be performed without need for manual review or approval, and may be in response to a determination that a turn restriction should be added or removed for a particular intersection, in response to receiving or sending a notification, or on any other basis. The updating may be performed one at a time, in a batch, at pre-determined times, or in any other manner. The update may be performed in any suitable manner.

3. Example Functional Implementation

Figure 2:
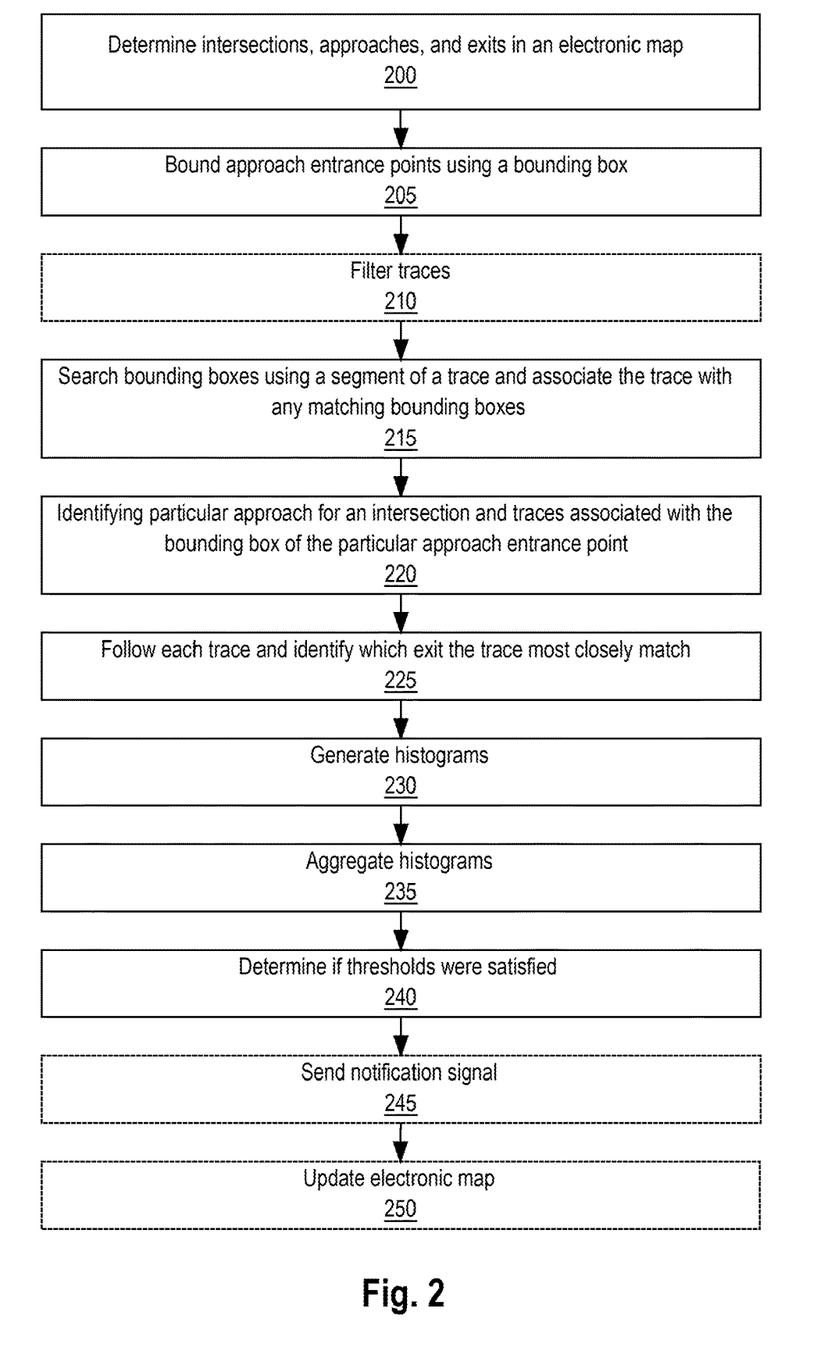
FIG. 2 illustrates a programmable algorithm or method in accordance with an embodiment.

FIG. 2 illustrates an example programmable algorithm or method for turn restriction detection. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 200, intersections, approaches, and exits in an electronic map are determined. The intersections, approaches, and exits may be determined in advance of turn restriction detection being performed, such as when the electronic map is generated or modified. Alternatively, the intersection may be determined in response to performing turn restriction detection, or at any other time. The intersections may include additional information as well, such as turn restriction information that was previously determined. The intersections may be determined in any manner, such as determining where two or more roads intersect. Likewise, the approaches and exits may be determined in any manner.

In step 205, approach entrance points are bounded using a bounding box. The bounding box defines an area associated with an entrance to an approach, and is used in identifying digital traces that are relevant to the approach. In other words, the bounding box is used to aid in identifying paths of vehicles that entered an intersection from a specific approach entrance point, thereby reducing the quantity of digital traces to consider when performing turn restriction detection.

In step 210, received traces are filtered. As indicated by the dotted line, traces may be received at any time and filtering may be performed at a different time, such as after step 215, or may not be performed. Traces are filtered to improve the quality of the turn restriction detection by removing unwanted or lower quality traces. For example, the traces may be filtered based on heading, to ensure that only vehicles that were heading the proper direction are considered. Similarly, a trace may be filtered because it contains too few, or too many, data points. Other factors include, but are not limited to: speed, time, application, etc.

In step 215, bounding boxes are searched using a segment of a trace. If a bounding box is identified, the trace is associated with the bounding box. The bounding boxes searched may represent any set of bounding boxes, such as all bounding boxes within an electronic map or a section of an electronic map. The bounding boxes may be searched using a tree. The tree may be any suitable tree, such as an R-tree. An R-tree is a data structure that is used to index multidimensional information, such as geographical coordinates. The tree may be generated in advance, or may be generated in response to a request to perform turn restriction detection. The tree is searched using a trace or segment of a trace as search terms. The traces may be associated with a bounding box in any manner, such as by flagging or otherwise storing the trace in a related manner to a bounding box. Thus, traces that are relevant to a particular bounding box are grouped together for subsequent use, such as to perform turn restriction detection. Alternatively, the bounding boxes may be searched in any other manner to determine which bounding box a trace or segment of a trace is associated with. Step 215 may be performed for each trace, and may be performed at any time.

In step 220, a particular approach for an intersection and the traces associated with the bounding box of the particular approach entrance point are identified.

In step 225, each trace is followed and the exit most closely matching, or nearest, the end of the trace is identified. A trace may be followed until the end of the trace, or may be followed a predetermined distance, such as 100 feet, 400 feet, or any other distance. If a predetermined distance is used, the predetermined distance should be long enough to ensure that the stopping point is past the exit to the intersection, to make the determination of which exit is nearest easier. The determination of which exit is nearest may be made in any manner and, once made, a count associated with the nearest exit is increased for use in generating histograms.

In step 230, histograms are generated. The histograms may be generated in any manner, using any time period. For example, the histograms may be generated based on fifteen minute intervals, hour intervals, day long intervals, etc.

In step 235, histograms are aggregated. Depending on the time interval used in step 230, step 235 may be optional. If a small time period such as fifteen minutes was used in step 230, then the various histograms may be aggregated to enable analysis at a longer time period in addition to more fine grained analysis.

In step 240, a determination is made whether thresholds were satisfied. The determination may be made on the histograms generated in step 230, from aggregated histograms of step 235, or some combination of both. The depending on the specific intersection and approach, a threshold may be satisfied when the threshold is exceed or when the threshold is not met. For example, if a turn restriction is preexisting in the electronic map for an intersection, then the threshold may be satisfied when a threshold is exceeded. Conversely, if there is no preexisting turn restriction in the electronic map for an intersection, then the threshold may be satisfied when the amount of turns made is below the threshold amount. The thresholds may be set to any amount, based on any factors. For example, the thresholds may be set based on historical turn data for the given intersection. The thresholds may be set to any amount, and may use a total number of traces that took the exit, a percentage of all traces for the approach traces that took the exit, etc.

In step 245, optionally a notification signal is sent, or other action is taken, in various embodiments. The notification may be in any format and sent to any suitable entity, such as a developer, administrator, user, etc. The notification may contain any information including, but not limited to: the intersection, the approach, the exits, what the threshold was, how far over or under the threshold the data is, time frame, or any other data. The notification may be used to take further steps, as necessary, including a closer review or study of the intersection, adding, removing, or altering a turn restriction in the electronic map, etc.

In some embodiments, step 245 does not comprise sending a notification. For example, threshold detection as described for step 240 could result in automatically removing, modifying, or adding a turn restriction to an intersection, adjusting thresholds for notifications, and adjusting other settings related to turn restriction detection, under computer program control and without a notification or manual review or intervention.

In step 250, the electronic map is updated. As indicated by the dotted lines, step 250 is optional. The electronic map may be updated based on the presence of a new turn restriction, the removal of an incorrect turn restriction, or for any other reason consistent with the invention described herein. The updating may occur on a per-determination basis. In other words, the electronic map may be updated each time a new or incorrect turn restriction is detected. Alternatively, the electronic map may updated multiple turn restrictions at predetermined times, such as once a day, once a week. The updating may be in response to the notifications discussed in step 245, may be reviewed or approved by an administrator or other entity, or may be automatic without manual review or approval of the addition or removal of a turn restriction. The electronic map may be updated in any manner, depending on the type or format of electronic map that is used.

Using this process, the accuracy of electronic maps can be greatly improved. Specifically, turn restrictions may be added, removed, or modified for an electronic map based on data collected from actual trips taken in vehicles in the real world. The turn restriction detection process may run periodically, such as once a day or once a week, and allows the electronic map to rapidly adapt to changes in traffic laws, traffic patterns, closed roads, etc. Further, the turn restriction detection process described above ensures that high quality and relevant data is used to determine turn restrictions, and allows that data to be quickly processed.

4. Example Turn Restriction Detection

Figure 3A:
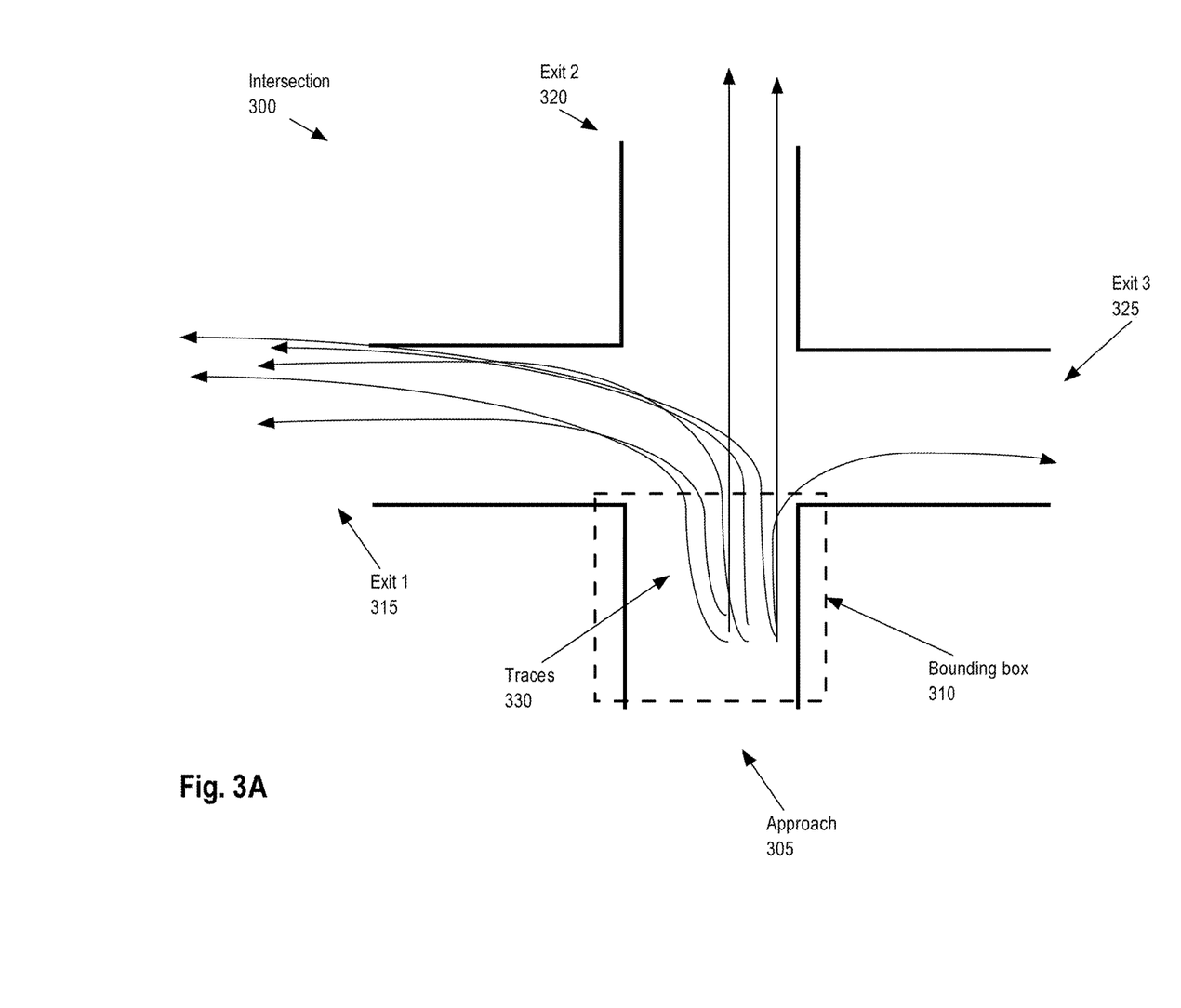
FIG. 3A and FIG. 3B graphically illustrate an example implementation of detecting a turn restriction.
Figure 3B:
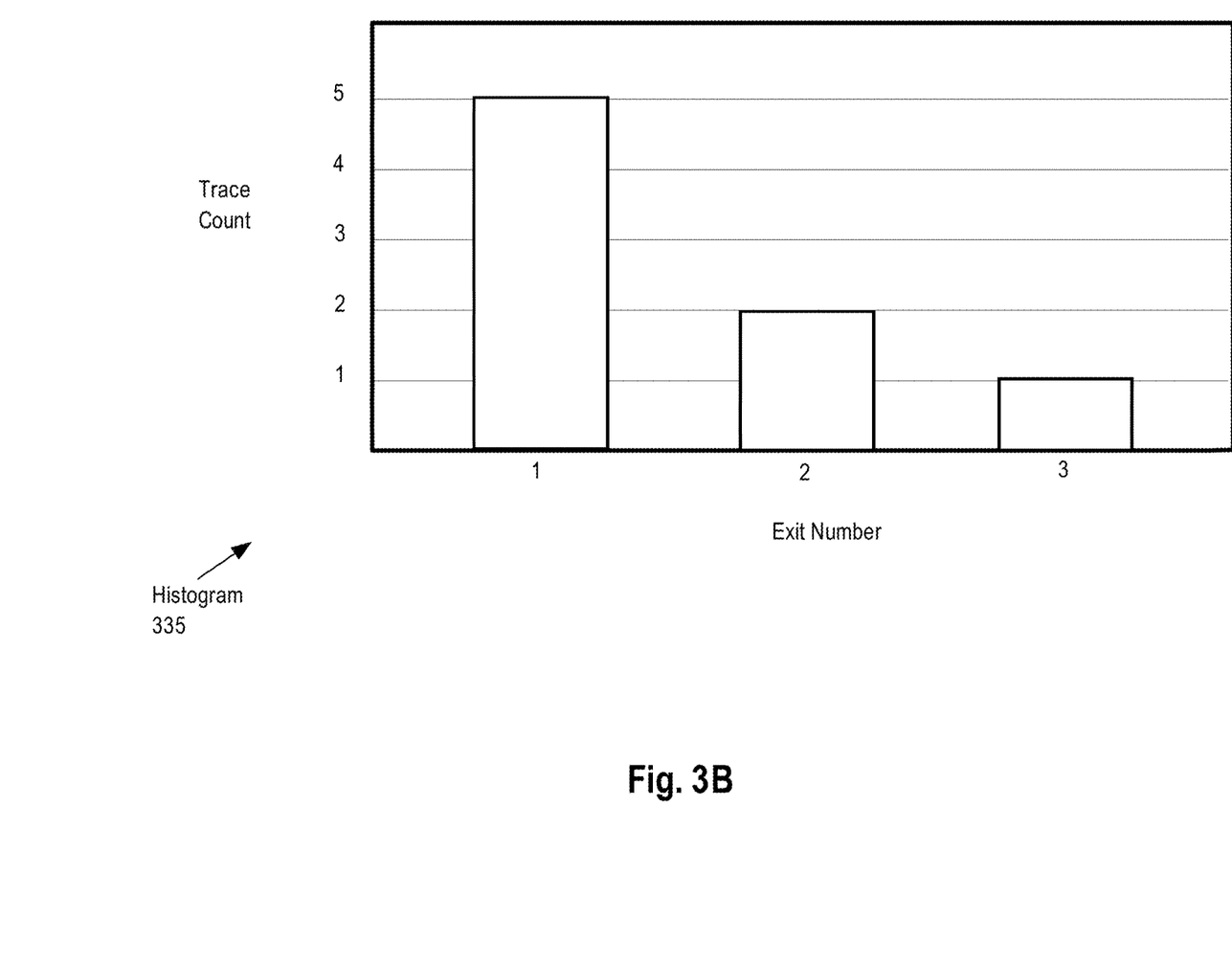

FIG. 3A and FIG. 3B illustrate an example of turn restriction detection in accordance with an embodiment.

In the embodiment of FIG. 3A, intersection 300 of an electronic map comprises an approach 305, first exit 315, second exit 320, and third exit 325. In the electronic map that includes intersection 300, there is a turn restriction in place for approach 305 in the digital map data. Specifically, left turns are not allowed according to the stored map data. However, in real-world practice, a recent change by the local government has allowed left turns at intersection 305. The electronic map has not been updated to reflect this, and the local government does not inform the developers of the electronic map. Without the methods described herein, the electronic map may not be updated for days or weeks. However, using the methods described herein, the electronic map is rapidly updated based on actual left turns taken by vehicles passing through intersection 300. The threshold for sending a notification for a specific exit of approach 305 has been previously set to 30% of all traces.

As illustrated in the example of FIG. 3A, using the embodiments described herein, bounding box 310 is placed around approach 305. The bounding box 310 is one of many bounding boxes in an electronic map. When traces 330 are received, segments of the traces are searched against a tree of bounding boxes to identify which bounding box each trace of traces 330 is associated with. Once determined, the traces 330 are associated with bounding box 310. Traces 330 may be further reduced by filtering based on any value or variable. After identifying traces 330, each trace is followed a predetermined distance and a determination is made regarding which of the three exits that trace most closely matches, or is nearest. The results are counted and tracked, and are shown in FIG. 3B.

As illustrated in the example of FIG. 3B, histogram 335 shows the results of determining which exit each of the traces in FIG. 3A were nearest. Thus, exit number 1 had five traces that were closest, exit number 2 had two traces that were closest, and exit number 3 had 1 trace that was closest. Thus, 62.5% of all traces made a left turn, while 25% went straight, and 12.5% went right. Since the threshold of 30% has been exceeded for exit 1, a notification is sent. In response to the notification, the data for the intersection and the exit is examined more closely, and a change to the electronic map data is made. Specifically, the turn restriction for exit 1 is removed.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 4:
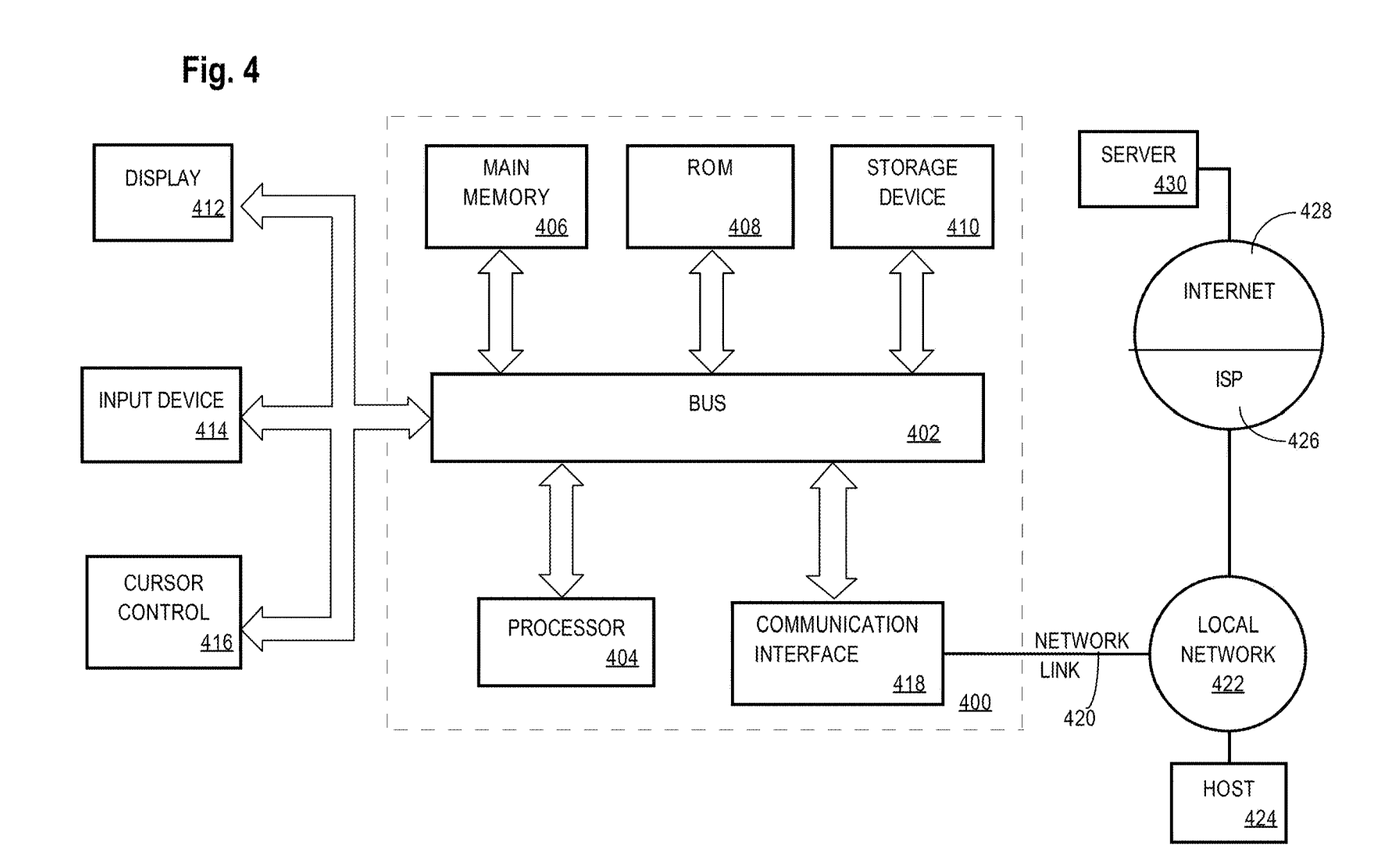
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and stored in storage device 410, or other non-volatile storage for later execution.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method providing an improvement in signaling a notification when movement signals from vehicles are inconsistent with digitally stored map data, the method comprising:
   identifying, in an electronic map comprising road data specifying a plurality of roads, intersection data specifying an intersection where two or more of the roads share a vertex, wherein the intersection data comprises (1) approach data specifying an approach that is an entrance for a vehicle into the intersection and (2) exit data specifying two or more exits from the approach;
   accessing a stored data structure comprising a plurality of bounding boxes comprising data values in memory representing points or lines that surround the approach, one of the bounding boxes being associated with the approach;
   identifying a plurality of traces;
   determining a map region associated with each of the plurality of traces based on a R-tree search of the plurality of bounding boxes;
   based on the determining, identifying a subset of the traces that cross the bounding box of the approach, and wherein each of the plurality of traces identifies a path of a vehicle on one or more of the plurality of roads;
   for each trace of the plurality of traces that cross the bounding box of the approach, identifying which of the two or more exits from the approach most closely matches the particular trace;
   generating histogram data comprising a plurality of histograms based on a time period and which of the two or more exits from the approach most closely matches each trace of the plurality of traces;
   determining, using the histogram data, whether one or more threshold values associated with one of the two or more exits is satisfied; and
   sending a notification signal when the one or more threshold values is satisfied.

2. The method of claim 1, further comprising:
   wherein a first threshold value of the one or more threshold values comprises a lower bound on traces associated with an exit of the two or more exits;
   in response to not satisfying the first threshold, updating the electronic map in digital data storage by adding a turn restriction associated with the exit to the intersection data in the electronic map.

3. The method of claim 2, further comprising removing the turn restriction from the intersection data after a limited amount of time.

4. The method of claim 2, further comprising transmitting the updated electronic map to a mobile computing device for use in displaying the updated electronic map with the turn restriction.

5. The method of claim 1, wherein a second threshold of the one or more thresholds comprises an upper bound on traces associated with an exit of the two or more exits; and
   the method further comprising, in response to satisfying the second threshold, removing a turn restriction associated with the exit from the intersection in the electronic map.

6. The method of claim 1, wherein each trace of the plurality of traces comprises two or more probe data values, wherein each probe data value comprises a latitude value, a longitude value, and a time value.

7. The method of claim 1, wherein identifying the traces that cross the bounding box of the approach comprises:
   receiving trace data;
   filtering the trace data using a heading value that is associated with the approach to identify a subset of trace data; and
   identifying that a particular trace of the subset crosses the bounding box associated with the approach.

8. The method of claim 7, further comprising identifying which of the two or more exits most closely matches the particular trace by following a particular trace for a predetermined distance for each trace of the subset of traces.

9. The method of claim 7 wherein the stored data structure is an R-tree data structure.

10. The method of claim 1, wherein each of the traces identifies the path of the vehicle on one or more of the plurality of roads that has been collected from a location-enabled device on or in the vehicle.

11. The method of claim 1, further comprising:
    updating, automatically in response to determining that the one or more threshold values associated with one of the two or more exits is satisfied, the electronic map by adding or removing a turn restriction for the approach.

12. The method of claim 1, further comprising periodically repeating the steps of claim 1 for all road data specifying roads and all intersection data specifying intersections.

13. A system comprising:
    a database;
    one or more servers communicatively connected to the database, the one or more servers comprising one or more processors and electronic digital memory storing one or more sequences of instructions which, when executed by the one or more processors, cause the one or more processors to perform:
    identifying, in an electronic map comprising road data specifying a plurality of roads, intersection data specifying an intersection where two or more of the roads share a vertex, wherein the intersection data comprises (1) approach data specifying an approach that is an entrance for a vehicle into the intersection and (2) exit data specifying two or more exits from the approach;
    accessing a stored data structure comprising a plurality of bounding boxes comprising data values in memory representing points or lines that surround the approach, one of the bounding boxes being associated with the approach;
    identifying a plurality of traces;
    determining a map region associated with each of the plurality of traces based on a R-tree search of the plurality of bounding boxes;
    based on the determining, identifying a subset of the traces that cross the bounding box of the approach, and wherein each of the plurality of traces identifies a path of a vehicle on one or more of the plurality of roads;

for each trace of the plurality of traces that cross the bounding box of the approach, identifying which of the two or more exits from the approach most closely matches the particular trace;

generating histogram data comprising a plurality of histograms based on a time period and which of the two or more exits from the approach most closely matches each trace of the plurality of traces;

determining, using the histogram data, whether one or more threshold values associated with one of the two or more exits is satisfied; and sending a notification signal when the one or more threshold values is satisfied.

14. The system of claim 13 wherein the stored data structure is an R-tree data structure.

15. The system of claim 13, wherein each of the traces identifies the path of the vehicle on one or more of the plurality of roads that has been collected from a location-enabled device on or in the vehicle.

16. The system of claim 13, wherein a second threshold of the one or more thresholds comprises an upper bound on traces associated with an exit of the two or more exits; and the one or more sequences of instructions which, when executed by the one or more processors, further cause the one or more processors to perform, in response to satisfying the second threshold, removing a turn restriction associated with the exit from the intersection in the electronic map.

17. The system of claim 13, wherein each trace of the plurality of traces comprises two or more probe data values, wherein each probe data value comprises a latitude value, a longitude value, and a time value.

18. The system of claim 13, the one or more sequences of instructions which, when executed by the one or more processors, further cause the one or more processors to perform:

receiving trace data;

filtering the trace data using a heading value that is associated with the approach to identify a subset of trace data; and identifying that a particular trace of the subset crosses the bounding box associated with the approach.

19. The system of claim 18, the one or more sequences of instructions which, when executed by the one or more processors, further cause the one or more processors to perform:

identifying which of the two or more exits most closely matches the particular trace by following a particular trace for a predetermined distance for each trace of the subset of traces.

20. The system of claim 13, the one or more sequences of instructions which, when executed by the one or more processors, further cause the one or more processors to perform:

wherein a first threshold value of the one or more threshold values comprises a lower bound on traces associated with an exit of the two or more exits;

in response to not satisfying the first threshold, updating the electronic map in digital data storage by adding a turn restriction associated with the exit to the intersection data in the electronic map.

21. The system of claim 20, the one or more sequences of instructions which, when executed by the one or more processors, further cause the one or more processors to perform:

removing the turn restriction from the intersection data after a limited amount of time.

22. The system of claim 20, the one or more sequences of instructions which, when executed by the one or more processors, further cause the one or more processors to perform:

transmitting the updated electronic map to a mobile computing device for use in displaying the updated electronic map with the turn restriction.

23. The system of claim 13, the one or more sequences of instructions which, when executed by the one or more processors, further cause the one or more processors to perform:

periodically repeating the steps of claim 11 for all road data specifying roads and all intersection data specifying intersections.

24. The system of claim 13, the one or more sequences of instructions which, when executed by the one or more processors, further cause the one or more processors to perform:

updating, automatically in response to determining that the one or more threshold values associated with one of the two or more exits is satisfied, the electronic map by adding or removing a turn restriction for the approach.

* * * * *

UNITED STATES PATENT AND TRADEMARK OFFICE
CERTIFICATE OF CORRECTION

| | | |
|---|---|---|
| PATENT NO. | : 10,008,110 B1 | Page 1 of 1 |
| APPLICATION NO. | : 15/435222 | |
| DATED | : June 26, 2018 | |
| INVENTOR(S) | : Herlocker et al. | |

It is certified that error appears in the above-identified patent and that said Letters Patent is hereby corrected as shown below:

On the Title Page (*) Notice: Delete "days. days." and insert --days.-- therefor In the Claims Column 17, Claim 16, Line(s) 24: after "and", insert --¶--

Column 18, Claim 23, Line(s) 35: delete "claim 11" and insert --claim 13-- therefor Signed and Sealed this
Ninth Day of April, 2019

Andrei Iancu
*Director of the United States Patent and Trademark Office*